H. McCown.
Nut Lock.
No. 90,567.      Patented May 25, 1869.

Witnesses:

Inventor
Harry McCown
by Prindle & Dyer attys.

United States Patent Office.

HARVEY McCOWN, OF ENON VALLEY, PENNSYLVANIA.

Letters Patent No. 90,567, dated May 25, 1869.

---

IMPROVEMENT IN NUT-LOCK.

---

The Schedule referred to in these Letters Patent and making part of the same.

---

*To all whom it may concern:*

Be it known that I, HARVEY McCOWN, of Enon Valley, in the county of Lawrence, and in the State of Pennsylvania, have invented a new and useful Improvement in Nut-Locks; and do hereby declare that the following is a full, clear, and exact description thereof, reference being had to the accompanying drawing, making a part of this specification, in which—

Letters of like name and kind refer to like parts in each of the figures.

My invention is an improvement upon a nut-lock for which Letters Patent, No. 87,953, were granted to me, March 16, 1869, and it consists of the peculiar form of the lock-washer which permits it to be used many times before becoming worthless.

In the annexed drawing—

A A represent the ends of two rails, and B B two clamps, forming the fish-joint, which are placed upon opposite sides of said rails, and the whole secured together by means of four bolts, C C, &c., passing through said clamps and rails, each bolt being provided with a nut, $c$, upon its end.

D represents a washer, corresponding in width to the longest diameter of said nuts, and slightly longer than the distance between their outer corners, when both are placed diagonally to the line of the bolts, and which washer is placed beneath said nuts, suitable holes being provided for the passage of the bolts.

Figure 1:
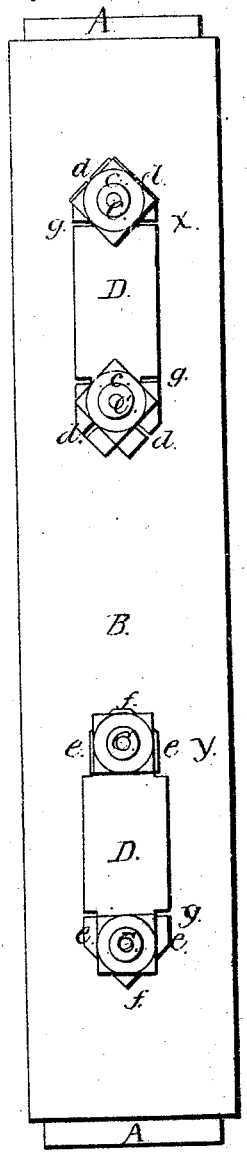
Figure 1 is a plan view, showing two modes of using the lock-washer.
Figure 2:
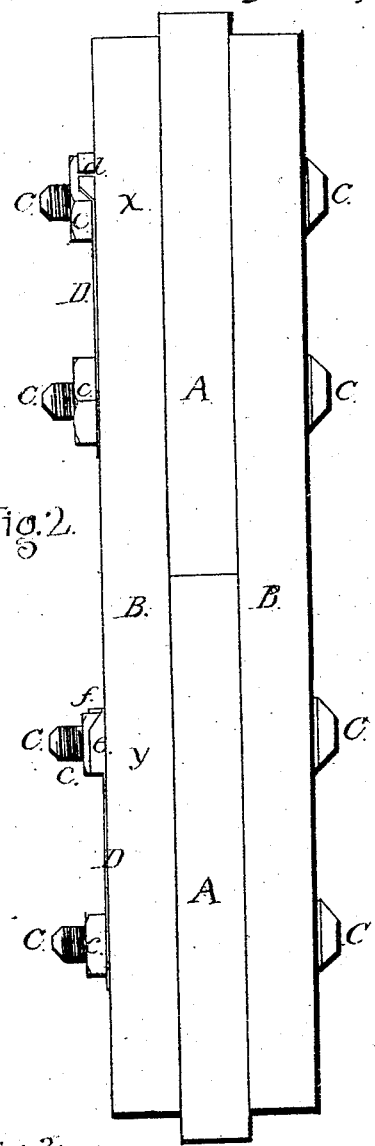
Figure 2 is an edge view of the same.
Figure 3:
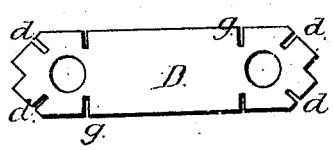
Figure 3 is a plan view of the lock-washer detached.

The ends of the washer D have a diamond-shaped piece cut therefrom, the point of which is inward, and just meets the corner of a nut placed diagonally, or with its longest diameter in a line with the centres of the bolts, leaving two parts to each end of said washers $d$ $d$, which extend beyond the edges of said nuts to a distance corresponding to the thickness of the same, so that if bent upward at a right angle, the upper edge of said part or end would reach about to the top of the nut, as shown at $x$ in figs. 1 and 2, and securely hold the same in place and prevent its turning.

It will be evident, however, that if the whole of one of said parts $d$ were bent upward, but one-half would be of use in holding said nut, as, in unscrewing, that portion of the side of said nut in the rear of the corners would leave the washer, while the portion in front of said corners would press more and more against it.

In order, therefore, to economize in the use of the washer, each part $d$ is slitted through the middle thereof, as far as the nut, so that one-half may be turned up each time, which, as but slight force is required, presents a sufficient resistance to prevent the nut from turning, and permits said washer to be used four times, as, after one-half of each of said pieces is broken off, by reversing the sides of the washer, an equal amount of use may be had.

When all of the parts $d$ $d$ are broken off, if the nuts are placed with their edges parallel to the line of the bolts, as at $y$, the washer will project at its end and sides beyond the nut, so that by slitting said washer laterally from its edge to or beyond the sides of the nut, as shown in the drawing, the sides $e$ $e$ may be turned up, and, with the point $f$, furnish means for locking said nut three more times.

In addition to the above, the edges of the washer, at $g$, may be turned up so as to present the ends, formed by the lateral slit, to the corners of said nut, and thereby enable said washer to be used twice more.

From the foregoing description it will be seen that each washer is capable of being used to lock two nuts nine times, even though the part turned up each time should be broken off when bent down; but as, on the contrary, the material employed, whether iron or copper, could be bent upward and straightened out many times before breaking, the number of applications of which said washer is capable would be largely in excess of that stated.

Having thus fully set forth the nature and merits of my invention,

What I claim as new, and desire to secure by Letters Patent, is—

The washer D, for locking nuts, when constructed substantially as described, and for the purpose set forth.

In testimony that I claim the foregoing, I have hereunto set my hand, this 30th day of April, 1869.

HARVEY McCOWN.

Witnesses:
SUE McCOWN,
CAROLINA McCOWN.